(12) United States Patent
Dagh et al.

(10) Patent No.: US 11,408,475 B2
(45) Date of Patent: Aug. 9, 2022

(54) WHEEL BRAKE ARRANGEMENT

(71) Applicant: Volvo Truck Corporation, Gothenburg (SE)

(72) Inventors: Ingemar Dagh, Gothenburg (SE); Kent Augustsson, Bollebygd (SE); Tobias Andersson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 805 days.

(21) Appl. No.: 16/337,196

(22) PCT Filed: Oct. 6, 2016

(86) PCT No.: PCT/EP2016/073887
§ 371 (c)(1),
(2) Date: Mar. 27, 2019

(87) PCT Pub. No.: WO2018/065056
PCT Pub. Date: Apr. 12, 2018

(65) Prior Publication Data
US 2019/0226540 A1    Jul. 25, 2019

(51) Int. Cl.
*F16D 65/12* (2006.01)
*B60B 27/00* (2006.01)
*F16D 65/02* (2006.01)

(52) U.S. Cl.
CPC ........ *F16D 65/123* (2013.01); *B60B 27/0052* (2013.01); *B60B 2900/112* (2013.01);
(Continued)

(58) Field of Classification Search
CPC ....................... F16D 65/12; F16D 65/123–128
(Continued)

(56) References Cited

U.S. PATENT DOCUMENTS

| 4,550,809 A | 11/1985 | Kawaguchi |
| 2003/0006104 A1 | 1/2003 | Baumgartner et al. |

(Continued)

FOREIGN PATENT DOCUMENTS

| CN | 1193301 A | 9/1998 |
| CN | 1459007 A | 11/2003 |

(Continued)

OTHER PUBLICATIONS

First Office Action with English Machine Translation for Chinese Patent Application No. 201680089801 7, dated Mar. 16, 2020, 8 pages.
(Continued)

*Primary Examiner* — Christopher P Schwartz
(74) *Attorney, Agent, or Firm* — Withrow & Terranova, PLLC

(57) ABSTRACT

A wheel brake arrangement for a wheel of a vehicle, said wheel brake arrangement comprising a wheel hub (102) comprising an outwardly facing gear teeth arrangement (104) arranged in a circumferential direction thereof; and a brake disc (106) comprising an inwardly facing gear teeth arrangement (108) arranged in meshed connection with the outwardly facing gear teeth arrangement of the wheel hub for preventing a relative circumferential movement between the brake disc and the wheel hub, wherein one of the wheel hub and the brake disc comprises a circumferentially arranged groove (110); wherein the wheel brake arrangement further comprises at least one retainer (112) connected between the wheel hub and the brake disc for preventing a relative axial movement between the wheel hub and the brake disc, wherein the at least one retainer is at least partially arranged in the circumferentially arranged groove (110) of one of the wheel hub and the brake disc.

12 Claims, 6 Drawing Sheets

(52) U.S. Cl.
CPC ... *B60B 2900/115* (2013.01); *B60B 2900/531* (2013.01); *F16D 2065/1304* (2013.01); *F16D 2065/1316* (2013.01); *F16D 2065/1372* (2013.01); *F16D 2065/1376* (2013.01); *F16D 2065/1384* (2013.01); *F16D 2065/1392* (2013.01)

(58) Field of Classification Search
USPC .............. 188/18 A, 218 XL, 264 A, 264 AA
See application file for complete search history.

(56) References Cited

U.S. PATENT DOCUMENTS

| | | |
|---|---|---|
| 2007/0193837 A1 | 8/2007 | Lamb |
| 2015/0069818 A1 | 3/2015 | Hester et al. |
| 2018/0180123 A1* | 6/2018 | Rankin ................ F16D 65/123 |

FOREIGN PATENT DOCUMENTS

| | | | |
|---|---|---|---|
| CN | 104919216 A | 9/2015 | |
| DE | 19807184 C1 * | 4/2000 | ........... F16D 65/123 |
| DE | 10125111 A1 | 12/2002 | |
| DE | 102007008725 B3 | 6/2008 | |
| DE | 102012010498 A1 | 11/2013 | |
| EP | 0143708 A2 | 6/1985 | |
| EP | 1026419 A2 | 8/2000 | |
| EP | 2679854 A1 | 1/2014 | |
| WO | 0225135 A1 | 3/2002 | |

OTHER PUBLICATIONS

International Preliminary Report on Patentability for International Patent Application No. PCT/EP2016/073887, dated Sep. 14, 2018, 6 pages.

International Search Report and Written Opinion for International Patent Application No. PCT/EP2016/073887, dated Jun. 9, 2017, 9 pages.

* cited by examiner

WHEEL BRAKE ARRANGEMENT

This application is a 35 USC 371 National Phase filing of International Application No. PCT/EP2016/073887, filed Oct. 6, 2016, the disclosure of which is incorporated herein by reference in its entirety.

TECHNICAL FIELD

The present invention relates to a wheel brake arrangement. The invention is applicable on vehicles, in particularly low, medium and heavy duty vehicles commonly referred to as trucks. Although the invention will mainly be described in relation to a truck, it may also be applicable for other type of vehicles such as e.g. buses, working machines, cars, etc.

BACKGROUND

In connection with vehicles in the form trucks, also known as low-, medium and heavy duty vehicles, there is always a high demand on the wheel brakes. These demands relate in particular to the braking capability of the wheel brake as they need to function properly in order to reduce vehicle speed properly.

Typically, the wheel brake comprises a brake disc connected to a wheel hub, which in turn is connected to a respective wheel of the vehicle. The wheel brake further comprises brake pads which are arranged to provide a brake action against the brake disc, i.e. clamp against the brake disc, such that a rotation speed of the wheel is reduced. The brake disc will thus slip against the brake pads until the wheel has stopped its motion. This creates frictional heat in the brake disc which needs to be taken care of.

Furthermore, as trucks continuously develop to meet various demands from the market, also the wheel brakes and its associated components are continuously developed to e.g. be more cost effective, more durable, increase its ability of handling the developed frictional heat, etc.

There is thus a desire to improve a wheel brake arrangement for reducing its production costs as well as improving its functionalities.

SUMMARY

It is an object of the present invention to provide a wheel brake arrangement that is more cost efficient as well as enabling for improved functionalities in comparison to the prior art. The object is at least partly achieved by a wheel brake arrangement according to claim 1.

According to a first aspect of the present invention, there is provided a wheel brake arrangement for a wheel of a vehicle, the wheel brake arrangement comprising a wheel hub comprising an outwardly facing gear teeth arrangement arranged in a circumferential direction thereof; and a brake disc comprising an inwardly facing gear teeth arrangement arranged in meshed connection with the outwardly facing gear teeth arrangement of the wheel hub for preventing a relative circumferential movement between the brake disc and the wheel hub, wherein one of the wheel hub and the brake disc comprises a circumferentially arranged groove; wherein the wheel brake arrangement further comprises at least one retainer connected between the wheel hub and the brake disc for preventing a relative axial movement between the wheel hub and the brake disc, wherein the at least one retainer is at least partially arranged in the circumferentially arranged groove of one of the wheel hub and the brake disc.

The wording "outwardly facing gear teeth arrangement" should in the following and throughout the entire description be interpreted as the top surfaces of the gear teeth, i.e. the gear teeth ridges, are facing away from a geometric center axis of the wheel hub. Similarly, the wording "inwardly facing gear teeth arrangement" should be understood to mean that the top surfaces of the gear teeth, i.e. the gear teeth ridges, are facing the geometric center axis of the wheel hub. The gear teeth arrangements may be formed by e.g. a spline arrangement, cog profile, toothed connection, etc.

Furthermore, the wording "circumferentially arranged groove" should be understood to mean a groove in one of the brake disc and the wheel hub, which groove has an extension in the circumferential direction thereof. The groove may of course have an extension in the axial direction as well and does not necessarily have to be arranged around the entire circumference of the brake disc or the wheel hub, but could rather be arranged piecewise in the circumferential direction.

An advantage of the present invention is that a simplified lock-up of the brake disc against the wheel hub is provided. The connection between the gear teeth arrangements and the retainer positioned in the groove effectively prevents the brake disc from moving axially and circumferentially relative to the wheel hub. Furthermore, by providing the retainer for preventing the relative axial movement between the brake disc and the wheel hub reduces the contact surfaces between the brake disc and the wheel hub. This is advantageous as a reduction of heat transfer between these components is achieved.

Furthermore, the invention enable for a simplified assembling of the brake disc to the wheel hub as a less number of components is needed for connection thereto. Also, the invention enables for the provision of a less number of gear teeth which in turn reduces the total number of contact surfaces between the brake disc and the wheel hub. Hereby, a reduction of heat transfer is provided.

According to an example embodiment, at least one retainer may comprise a through-hole extending in the axial direction of the wheel brake arrangement, wherein the wheel brake arrangement further comprises a fixation means connecting the at least one retainer to one of the wheel hub and the brake disc through the through-hole of the retainer.

Hereby, the retainer is securely connected to one of the wheel hub and the brake disc. The fixation means may, for example, be a bolt, screw or other suitable means for connection of the retainer.

According to an example embodiment, the circumferentially arranged groove may be arranged in the outwardly facing gear teeth arrangement of the wheel hub, wherein the circumferentially arranged groove divides the outwardly facing gear teeth arrangement into first and second axially separated gear teeth portions.

An advantage is that the interruption in the gear teeth arrangement provides for an effective stop in the axial direction for the retainer. Further, it is relatively simple to provide the circumferentially arranged groove in the gear teeth arrangement as only the gear teeth ridges need to be machined. The circumferentially arranged groove may preferably be an intermittent groove cutting through the ridges of the gear teeth arrangement. The circumferentially arranged groove may however also be a continuous groove.

According to an example embodiment, the outwardly facing gear teeth arrangement of the wheel hub may comprise alternating ridges and grooves in the circumferential direction thereof, wherein the at least one retainer is connected to the brake disc by a fixation means positioned radially above one of the grooves of the outwardly facing gear teeth arrangement.

The wording "radially above" should in the following and throughout the entire description be interpreted as being in relation to a geometric axis of the wheel hub, e.g. the wheel axle. Hence, the fixation means is position at a radial distance further away from the geometric axis of the wheel hub in comparison to the groove of the outwardly facing gear teeth arrangement.

Hereby, it is easier to connect the fixation means to the brake disc as further space is available.

According to an example embodiment, a width of the groove of the outwardly facing gear teeth arrangement positioned radially below the fixation means may be larger than a width of a groove at an opposite side of an adjacent ridge thereof.

The wording "radially below" should be interpreted in relation to the geometric axis of the wheel hub. Also, the adjacent ridge should be understood as a ridge in direct connection to the groove with the wider dimension. Hence, the ridge has a groove with larger width on one side compared to the width of the groove on the other side thereof. Also, the width of the groove should be understood to be larger in the circumferential direction.

Hereby, even further space is provided for connecting the fixation means to the brake disc. Also, providing a larger width of the gear teeth groove enables for a larger fixation means which can e.g. withstand higher loads. Also, a simplified assembly of the wheel brake arrangement may be provided.

According to an example embodiment, an inner radius of the at least one retainer may be smaller than a radius of the circumferentially arranged groove of the wheel hub, such that the retainer is radially pre-tensioned in the circumferentially arranged groove of the wheel hub.

It should be readily understood that the "inner radius" of the at least one retainer is a radius of a surface of the retainer facing the geometric axis of the wheel hub when the retainer is connected to the wheel brake arrangement. Likewise, the radius of the circumferentially arranged groove is an inner surface of the groove at which the inner radius of the retainer is in contact with.

An advantage of providing the at least one retainer radially pre-tensioned in the groove is that an improved fixation between the retainer and the wheel hub is provided.

According to an example embodiment, the at least one retainer may comprise at least one protruding portion facing away from the brake disc; and at least one indentation facing the brake disc.

The inventors of the present invention have unexpectedly realized that the protruding portion and the indentation of the retainer provide an improved lock-up of the retainer. Hence, when being connected in the circumferential groove and fixated by means of the fixation means, the retainer will bend and connect against an axially facing inner surface of the groove as well as against a surface of the brake disc. It should however be readily understood that other structural modifications of the retainer may also achieve the desired bending characteristics thereof. For example, a nob, bulb, nipple, etc. may be provided in the retainer structure. Another alternative may be to pre-twist the retainer for achieving the desired effect.

According to an example embodiment, the at least one retainer may comprise a protruding portion and an indentation on each side of a through hole of the retainer as seen in the circumferential direction of the wheel brake arrangement.

Hereby, the bending of the retainer will be possible on each side of the through-hole.

According to an example embodiment, the protruding portion and the indentation may be arranged on the same circumferential position of the retainer.

According to an example embodiment, the retainer may comprise a bent portion at an end portion thereof as seen in the circumferential direction of the wheel brake arrangement.

The "bent portion" should be understood to mean that the portion is bent in the axial direction of the wheel brake arrangement.

According to an example embodiment, the fixation means may be a bolt connected to a bolt hole in the brake disc.

According to an example embodiment, the circumferentially arranged groove may be arranged in the brake disc.

Hereby, the retainer is safely connected to the brake disc instead of the wheel hub as described above.

According to an example embodiment, the at least one retainer may be arranged in the circumferentially arranged groove of the brake disc, wherein the wheel brake arrangement comprises a fixation means connecting the at least one retainer to the wheel hub.

An alternative solution for axially fixating the brake disc to the wheel hub is thus provided. An advantage is that the retainer can be pre-assembled in the brake disc before mounting to the wheel hub.

According to a second aspect of the present invention, there is provided a retainer for a wheel brake arrangement, the retainer having an elongated shape with a through hole arranged to receive a bolt for connection to a brake disc of the wheel brake arrangement, wherein the retainer comprises at least one protruding portion and at least one indentation at a respective side of the through hole.

Effects and features of the second aspect are largely analogous to the retainer described above in relation to the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
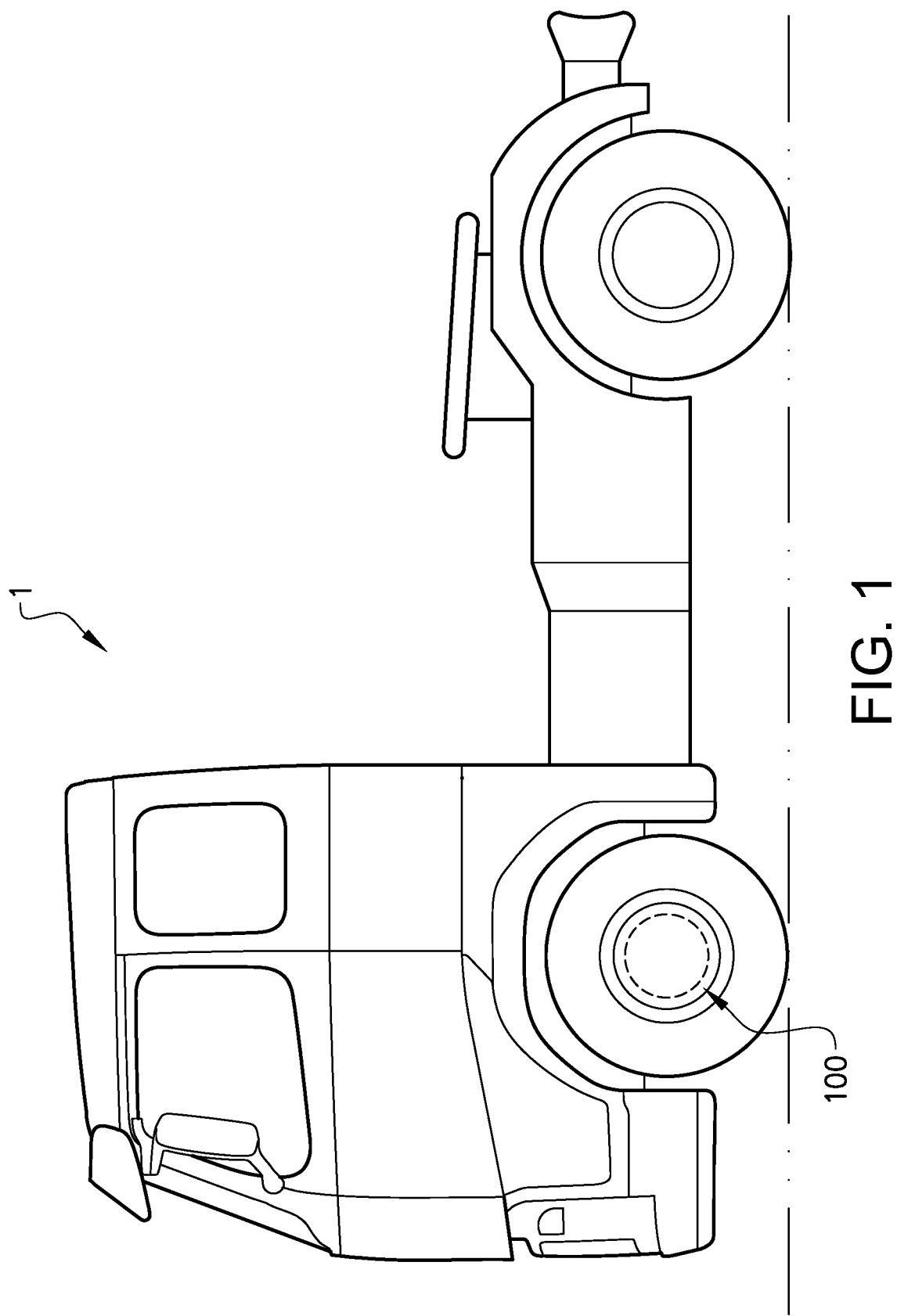
FIG. 1 is a side view of a heavy duty vehicle, in the form of a truck, provided with a wheel brake arrangement according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising a wheel brake arrangement 100 according to an example embodiment of the present invention. The vehicle 1 depicted in FIG. 1 is a heavy duty vehicle, here in the form of a truck, for which the inventive braking arrangement 100, which will be described further below, is particularly suitable for.

Figure 2:
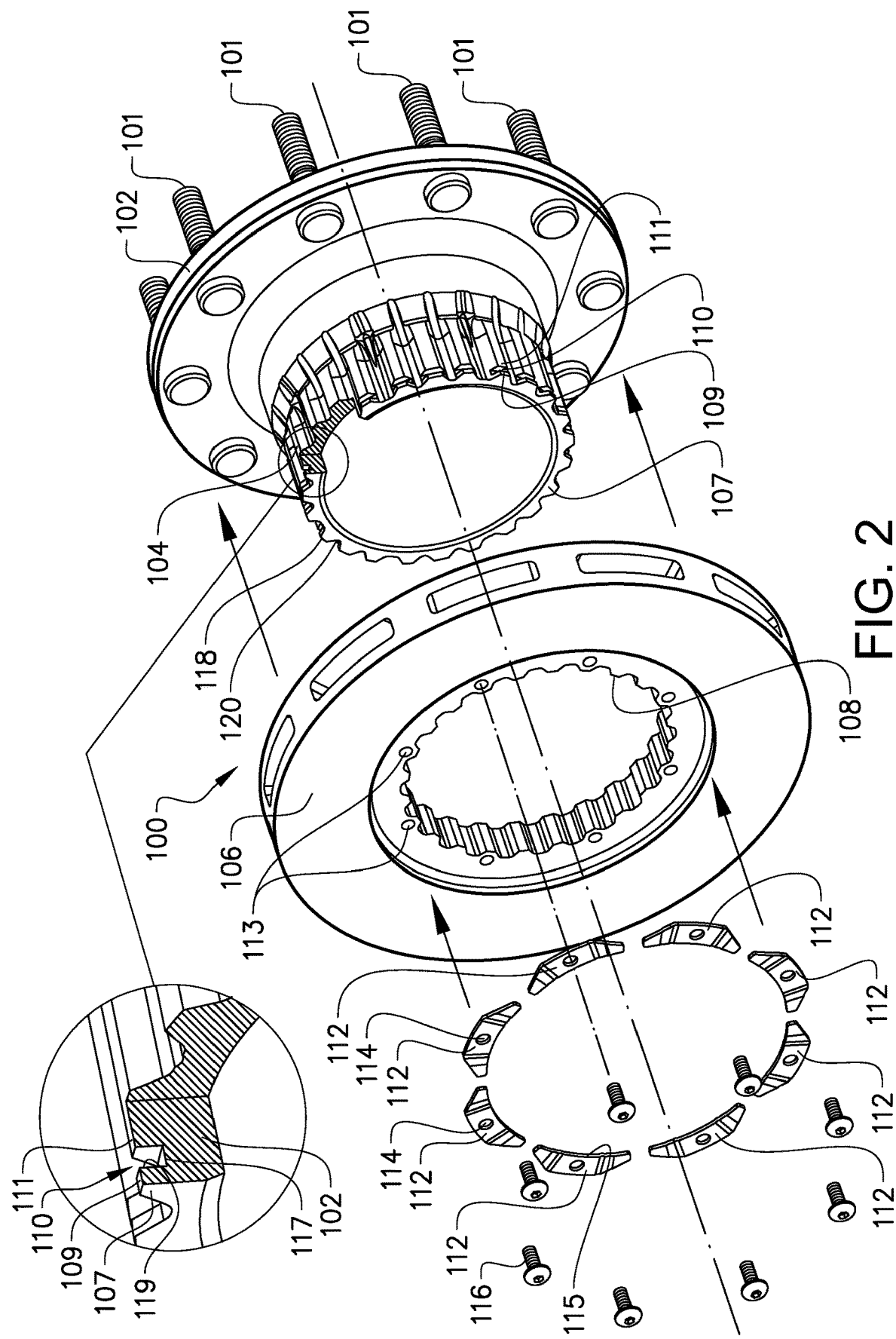
FIG. 2 is an exploded perspective view of a wheel brake arrangement according to an example embodiment of the present invention.

Turning now to FIG. 2, which is an exploded perspective view of a wheel brake arrangement 100 according to an example embodiment of the present invention. The wheel brake arrangement 100 comprises a wheel hub 102 which, via wheel bolts 101, is connected to a wheel (not shown) of the vehicle 1. The wheel brake arrangement 100 also comprises a brake disc 106 which is connected to the wheel hub 102. The brake disc 106 is arranged as the "stopping element" of the wheel brake arrangement 100 and configured to reduce the speed of the wheel of the vehicle 1 by being engaged by brake pads (not shown) on a respective side of the brake disc 106. Furthermore, the wheel brake arrangement 100 comprises a plurality of retainers 112. The retainers 112 are arranged as a connection between the wheel hub 102 and the brake disc 106 and are configured to prevent the brake disc 106 to move in at least one axial direction relative to the wheel hub 102. In the embodiment depicted in FIG. 2, eight retainers 112 are used, which are each connected to the brake disc 106 by a respective fixation means 116. The fixation means 116 is preferably a bolt 116 connected through a through-hole 114 of the retainer and connected in a bolt hole 113 of the brake disc 106. The bolt hole 113 is preferably a threaded bolt hole 113. Specifics of the retainers 112 will be described below in relation to the description of FIGS. 4a-4b.

As further depicted in FIG. 2, the wheel hub 102 comprises an outwardly facing gear teeth arrangement 104. The outwardly facing gear teeth arrangement 104 of the wheel hub 102 comprises alternating ridges 118 and grooves 120 as seen in the circumferential direction of the wheel hub 102. The alternating ridges 118 and grooves 120 extend in the axial direction of the wheel hub 102. The outwardly facing gear teeth arrangement 104 of the wheel hub 102 is arranged to be provided in meshed connection with an inwardly facing gear teeth arrangement 108 arranged on the brake disc 106. Hereby, a relative motion between the wheel hub 102 and the brake disc 106 in the circumferential direction of the wheel brake arrangement 100 is prevented.

Furthermore, the wheel hub 102 comprises a circumferentially arranged groove 110. The circumferentially arranged groove 110 is arranged in the outwardly facing gear teeth arrangement 104 of the wheel hub 102 and divides the outwardly facing gear teeth arrangement 104 into a first 109 and a second 111 axially separated gear teeth portion. The circumferentially arranged groove 110 is thus positioned at a non-zero distance from an axial end portion 107 of the wheel hub 102. The circumferentially arranged groove 110 is arranged to receive the at least one retainer 112, such that an inner surface 115 of the retainer connects to an inner surface 117 of the circumferentially arranged groove 110. Although FIG. 2 depicts a non-continuous circumferentially arranged groove 110, it should be readily understood that the circumferentially arranged groove 110 may equally as well be a continuous groove arranged around the circumferential direction of the wheel hub 102.

As described above, the brake disc 106 comprises an inwardly facing gear teeth arrangement 108 arranged in meshed connection with the outwardly facing gear teeth arrangement 104 of the wheel hub 102. Hence, each ridge of the outwardly facing gear teeth arrangement 104 faces a respective groove of the inwardly facing gear teeth arrangement 108.

Figure 3:
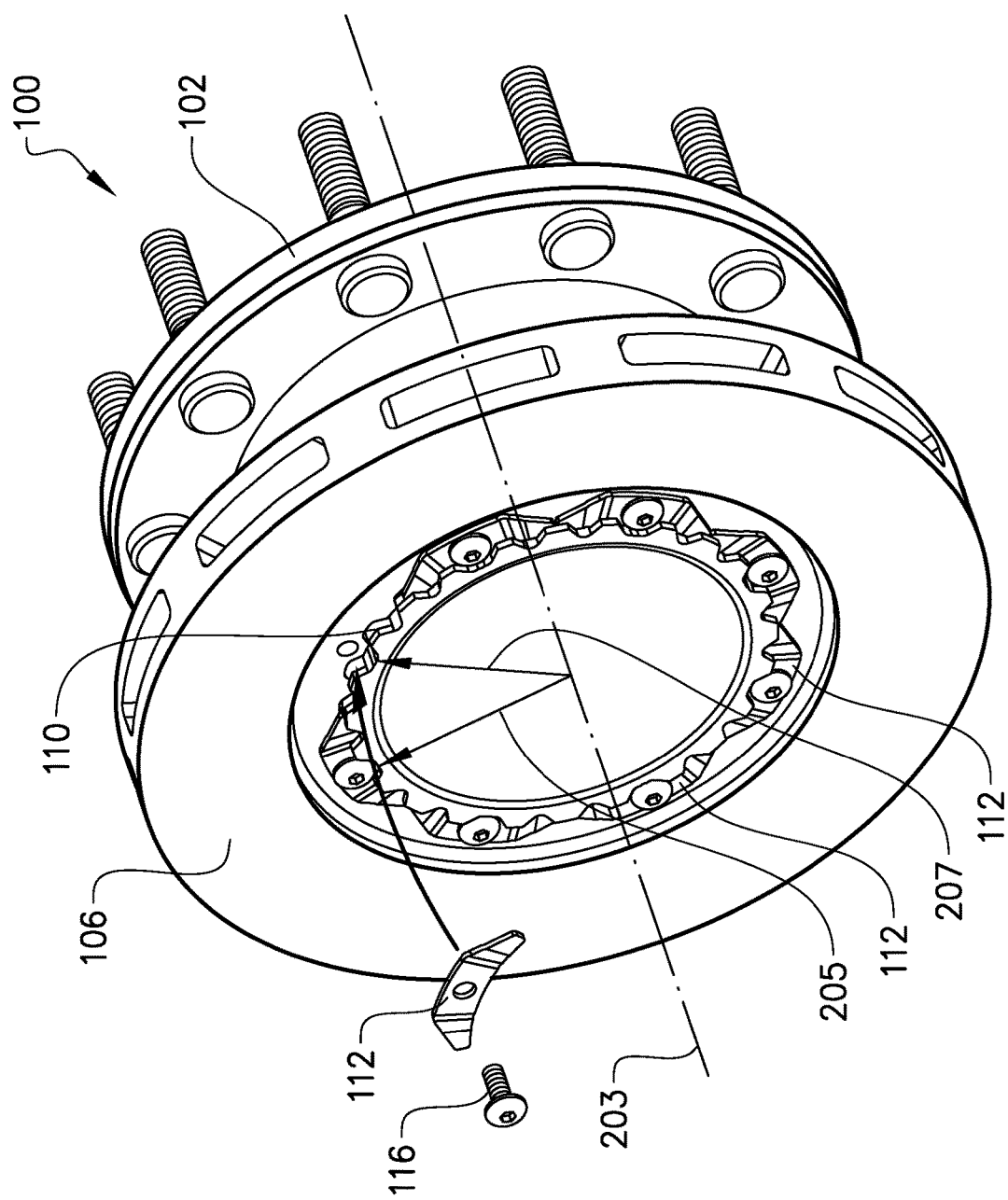
FIG. 3 illustrates the wheel brake arrangement in FIG. 2 in an at least partially assembled configuration.

Turning now to FIG. 3 which depicts the wheel brake arrangement 100 of FIG. 2 in an at least partially assembled configuration. Hence, the brake disc 106 is connected to the wheel hub 102 such that the inwardly facing gear teeth arrangement 108 (FIG. 2) of the brake disc 106 is in meshed connection with the outwardly facing gear teeth arrangement 104 (FIG. 2) of the wheel hub 102, and the plurality of retainers 112 is arranged in the circumferentially arranged groove 110 of the wheel hub 102 and connected to the brake disc 106 by means of a respective bolt 116.

Furthermore, the radius 205 of the inner surface 115 of the retainer 112, with respect to a geometric axis 203 of the wheel brake arrangement 100 is smaller than the radius 207 of the inner surface 117 of the circumferentially arranged groove 110. Hereby, the plurality of retainers 112 will be radially pre-tensioned in the circumferentially arranged groove 110, which will thus improve the connection between these components.

Figure 4A:
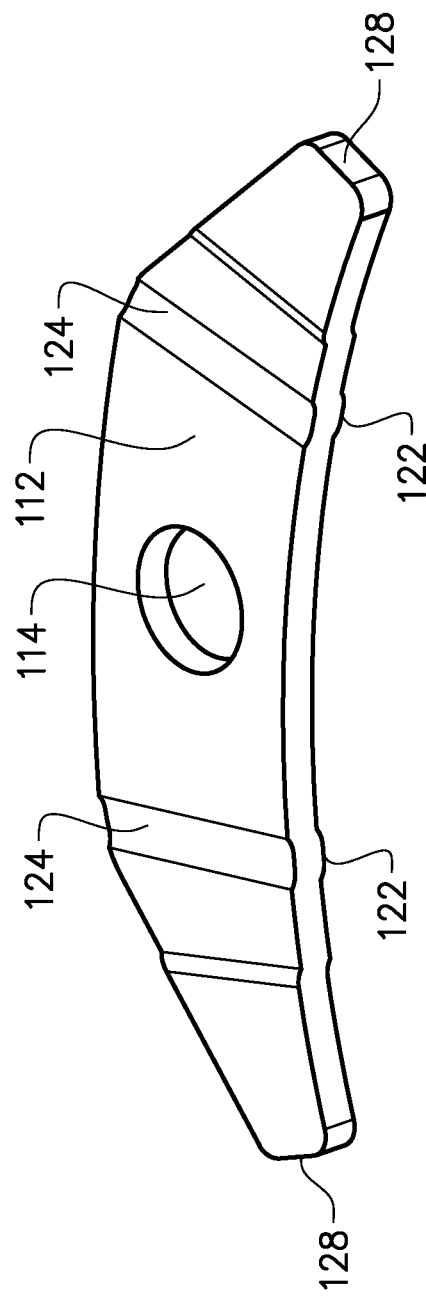
FIGS. 4a-4b depict an example embodiment of a retainer used in the wheel brake arrangement of FIGS. 2 and 3.
Figure 4B:
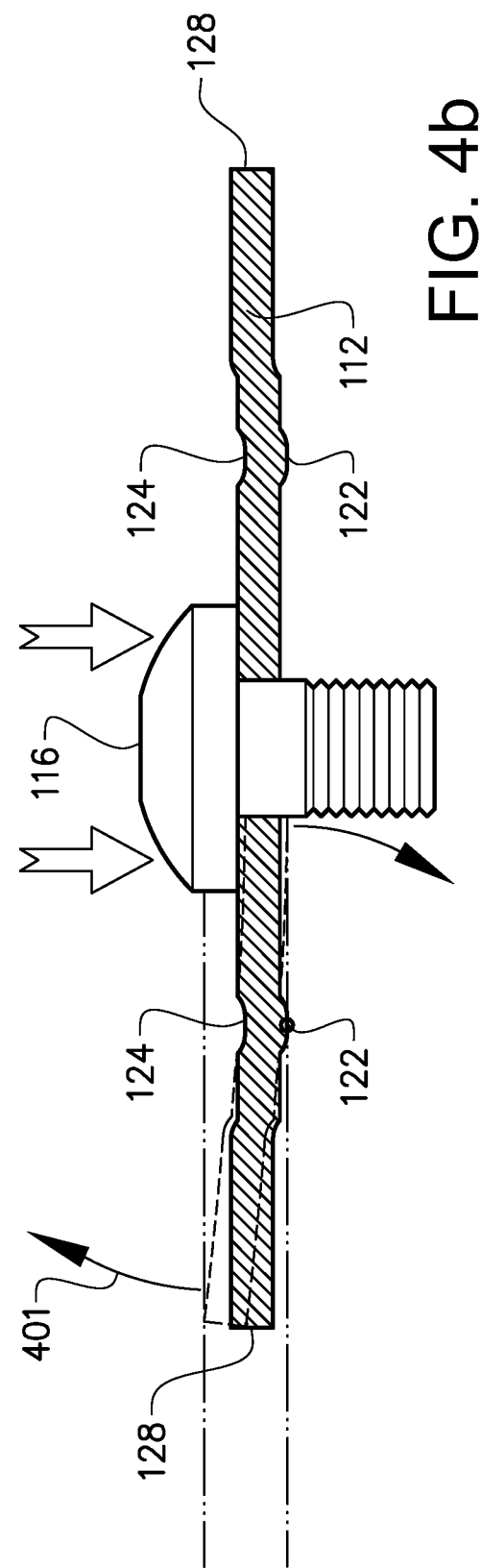

Turning now to FIGS. 4a-4b which illustrate the above described retainer 112 according to an example embodiment of the present invention. As illustrated, the retainer 112 has an extension in the circumferential direction of the wheel brake arrangement 100. Hereby, and as described above, the retainer 112 is thus provided in a slightly rounded shape with a radius 205 (see FIG. 3). Furthermore, the retainer 112 comprises a through-hole 114, through which the bolt 116 is directed when connecting the retainer 112 to the brake disc 106. The through-hole 114 is thus arranged in the axial direction of the wheel brake arrangement 100.

Furthermore, the retainer 112 comprises a protruding portion 122 and an indentation 124 on a respective side of the through-hole 114 as seen in the circumferential direction thereof. The protruding portion 122 and the indentation 124 are further arranged on a respective side of the retainer 112 as seen in the axial direction thereof. The protruding portion 122 and the indentation 124 thus extend in the radial direction of the wheel brake arrangement 100 when mounted thereto. By providing a protruding portion 122 and an indentation 124 as depicted in FIGS. 4a-4b, the retainer 112 will bend around the radial extension of the indentation 124 in a direction 401 away from the brake disc 106 when the bolt 116 connects the retainer 112 to the brake disc 106, see FIG. 4b. Hereby, outer end portions 128 of the retainer 112 will provide an axial compression force against a surface 119 (see FIG. 2) of the circumferentially arranged groove 110 facing the brake disc 106. Hereby, a tight fit is provided between the retainer 112 and the wheel hub 102.

When the retainer 112 is positioned in the circumferentially arranged groove 110, the retainer 112 will press against the surface 119 facing the brake disc 106 when the bolt 116 is attached, i.e. bolted, to the brake disc 106. This will thus provide a tight fit in the axial direction between the wheel hub 102 and the brake disc 106.

Furthermore, the above described retainers 112 are advantageous as they are relatively easy to manufacture and can thereby contributing to a more cost efficient brake disc arrangement 100. One reason is due to the fact that the retainers 112 can be cut into desired lengths from a relatively large sheet/strips of retainer material.

Figure 5:
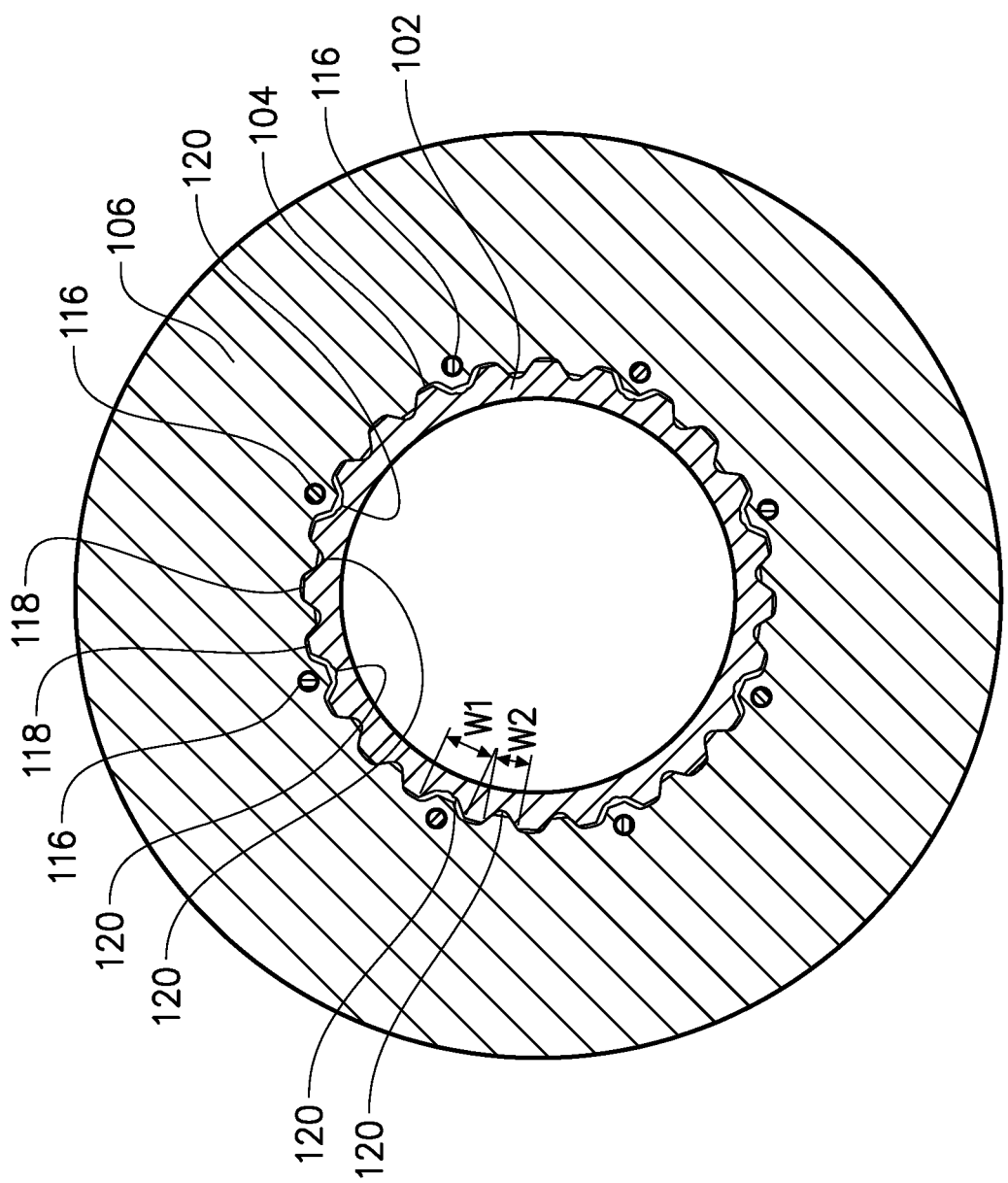
FIG. 5 is a cross-section of the wheel brake arrangement in FIGS. 2-3 illustrating an example embodiment of the gear teeth configuration.

With particular reference to FIG. 5 which is a cross-section of the above described wheel brake arrangement 100. In more detail, FIG. 5 illustrate the outwardly facing gear teeth arrangement 104 of the wheel hub 102, wherein the width in the circumferential direction of the grooves are not equal in size for all grooves 120 of the outwardly facing gear teeth arrangement 104. In detail, the grooves 120 arranged radially below a bolt 116 which connects the retainer 112 to the brake disc 106 has a larger width W1 in comparison to the width W2 of the remaining grooves of the outwardly facing gear teeth arrangement 104. An advantage is that it is easier to connect the bolt 116 to the retainer 112 and brake disc 106. A further advantage of connecting the retainer 112 to the brake disc 106 is that a reduced thickness of material of the wheel hub 102 may be achieved. This will in turn provide a more compact wheel brake arrangement 100.

Figure 6:
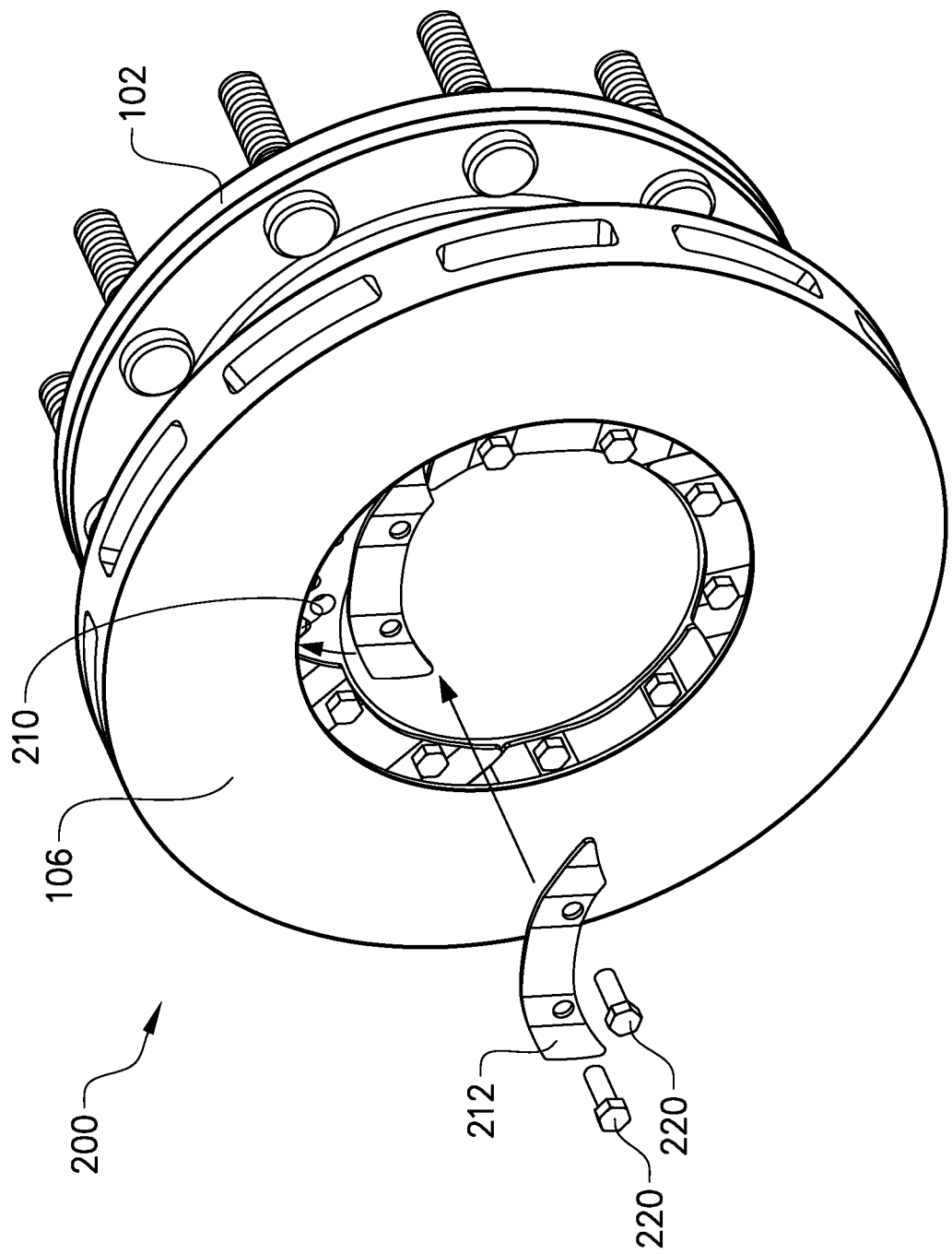
FIG. 6 is a wheel brake arrangement according to another example embodiment of the present invention.

Turning now to FIG. 6, which is a wheel brake arrangement 200 according to another example embodiment of the present invention. The following will only describe the differences relative to the wheel brake arrangement 100 described above in relation to FIGS. 2-5.

As can be seen from FIG. 6, the retainer 212 is connected to the brake disc 106 via a circumferentially arranged groove 210 arranged in the brake disc 106. The circumferentially arranged groove 210 in the brake disc 106 is preferably arranged at an axial end of the inwardly facing gear teeth arrangement 108 of the brake disc 106. Furthermore, the retainer 212 is connected to the wheel hub 102 by means of the fixation means 220, i.e. bolt/bolts. Hence, the bolt(s) 220 is arranged through the through-hole of the retainer and connected to the wheel hub 102 of the wheel brake arrangement 200.

It is to be understood that the present invention is not limited to the embodiments described above and illustrated in the drawings; rather, the skilled person will recognize that many changes and modifications may be made within the scope of the appended claims. For example, the retainer may also be connected to both the brake disc as well as the wheel hub. In such case, one bolt is connected through one of the through holes in the retainer and into the brake disc, while another bolt is connected through another through hole in the retainer and into the wheel hub.

The invention claimed is:

1. A wheel brake arrangement for a wheel of a vehicle, said wheel brake arrangement comprising a wheel hub comprising an outwardly facing gear teeth arrangement arranged in a circumferential direction thereof; and a brake disc comprising an inwardly facing gear teeth arrangement arranged in meshed connection with the outwardly facing gear teeth arrangement of the wheel hub for preventing a relative circumferential movement between the brake disc and the wheel hub, wherein one of the wheel hub and the brake disc comprises a circumferentially arranged groove; wherein the wheel brake arrangement further comprises at least one retainer connected between the wheel hub and the brake disc for preventing a relative axial movement between the wheel hub and the brake disc, wherein the at least one retainer is at least partially arranged in the circumferentially arranged groove of one of the wheel hub and the brake disc, characterized in that the at least one retainer comprises a through-hole extending in the axial direction of the wheel brake arrangement, wherein the wheel brake arrangement further comprises a fixation means connecting the at least one retainer to one of the wheel hub and the brake disc through the through-hole of the retainer.

2. The wheel brake arrangement according to claim 1, wherein the circumferentially arranged groove is arranged in the outwardly facing gear teeth arrangement of the wheel hub, wherein the circumferentially arranged groove divides the outwardly facing gear teeth arrangement into first and second axially separated gear teeth portions.

3. The wheel brake arrangement according to claim 1, wherein the outwardly facing gear teeth arrangement of the wheel hub comprises alternating ridges and grooves in the circumferential direction thereof, wherein the at least one retainer is connected to the brake disc by a fixation means positioned radially above one of the grooves of the outwardly facing gear teeth arrangement.

4. The wheel brake arrangement according to claim 3, wherein a width of the groove of the outwardly facing gear teeth arrangement positioned radially below the fixation means is larger than a width of a groove at an opposite side of an adjacent ridge thereof.

5. The wheel brake arrangement according to claim 1, wherein an inner radius of the at least one retainer is smaller than a radius of the circumferentially arranged groove of the wheel hub, such that the retainer is radially pre-tensioned in the circumferentially arranged groove of the wheel hub.

6. The wheel brake arrangement according to claim 1, wherein the at least one retainer comprises at least one protruding portion facing away from the brake disc; and at least one indentation facing the brake disc.

7. The wheel brake arrangement according to claim 6, wherein the at least one retainer comprises a protruding portion and an indentation on each side of a through hole of the retainer as seen in the circumferential direction of the wheel brake arrangement.

8. The wheel brake arrangement according to claim 6, wherein the protruding portion and the indentation are arranged on the same circumferential position of the retainer.

9. The wheel brake arrangement according to claim 1, wherein the retainer comprises a bent portion at an end portion thereof as seen in the circumferential direction of the wheel brake arrangement.

10. The wheel brake arrangement according to claim 1, wherein the fixation means is a bolt connected to a bolt hole in the brake disc.

11. The wheel brake arrangement according to claim 1, wherein the circumferentially arranged groove is arranged in the brake disc.

12. The wheel brake arrangement according to claim 11, wherein the at least one retainer is arranged in the circumferentially arranged groove of the brake disc, wherein the wheel brake arrangement comprises a fixation means connecting the at least one retainer to the wheel hub.

* * * * *